US011819933B2

(12) United States Patent
Green et al.

(10) Patent No.: US 11,819,933 B2
(45) Date of Patent: *Nov. 21, 2023

(54) METHOD AND APPARATUS FOR TRIMMING A CONTAINER (71) Applicant: BELVAC PRODUCTION MACHINERY, INC., Lynchburg, VA (US)

(72) Inventors: Dennis E. Green, Lynchburg, VA (US); Christopher Bright, Roanoke, VA (US)

(73) Assignee: BELVAC PRODUCTION MACHINERY, INC., Lynchburg, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/496,331

(22) Filed: Oct. 7, 2021

(65) Prior Publication Data

US 2022/0023961 A1 Jan. 27, 2022

Related U.S. Application Data (63) Continuation of application No. 16/607,448, filed as application No. PCT/US2018/028907 on Apr. 23, 2018, now Pat. No. 11,141,802.

(Continued)

(51) Int. Cl.
*B23D 31/00* (2006.01)
*B21D 51/26* (2006.01)
*B23B 3/00* (2006.01)

(52) U.S. Cl.
CPC ....... *B23D 31/001* (2013.01); *B21D 51/2615* (2013.01); *B23B 3/00* (2013.01)

(58) Field of Classification Search
CPC ...... B23D 31/001; B23D 31/00; B23D 21/04; B23D 21/00; B23D 19/04
See application file for complete search history.

(56) References Cited

U.S. PATENT DOCUMENTS 2,759,541 A 8/1956 Reid
3,581,691 A 6/1971 Ringler
(Continued)

FOREIGN PATENT DOCUMENTS

CN 87100732 A 10/1987
CN 101708785 A 5/2010
(Continued)

OTHER PUBLICATIONS

Notice of Reasons for Rejection in Japanese Patent Application No. JP 2019-558389, dated Apr. 18, 2022 (6 pages w/English translation).

(Continued)

*Primary Examiner* — Alan Snyder
(74) *Attorney, Agent, or Firm* — NIXON PEABODY LLP (57) ABSTRACT A trimmer device includes an inner mounting block having a first central aperture for receiving a turret shaft. The inner mounting block has an inner bore. The device includes an outer mounting block having a second central aperture for receiving the turret shaft. The outer mounting block has at least one outer bore. The device includes an inner trimmer spindle positioned through the inner bore. A first end of the inner trimmer spindle includes a pilot having an inner spindle blade. The device further includes an outer trimmer spindle positioned through the outer bore. The outer trimmer spindle includes an outer spindle blade positioned at a first end. At least one of the inner mounting block or the outer mounting block is rotatable about the turret shaft to adjust for a diameter of an article such that the article is positioned between the inner and outer spindle blades for trimming.

21 Claims, 12 Drawing Sheets

Related U.S. Application Data (60) Provisional application No. 62/492,030, filed on Apr. 28, 2017.

(56) References Cited

U.S. PATENT DOCUMENTS

| | | |
|---|---|---|
| 3,894,455 A | 7/1975 | Stroobants |
| 4,030,432 A | 6/1977 | Miller |
| 5,146,818 A | 9/1992 | Hellweg |
| 7,938,049 B2 | 5/2011 | Reynolds |
| 8,953,817 B2 | 2/2015 | Mejia |
| 2007/0193421 A1 | 8/2007 | Reynolds |

FOREIGN PATENT DOCUMENTS

| | | |
|---|---|---|
| CN | 202377596 U | 8/2012 |
| CN | 103121127 A | 5/2013 |
| JP | S51-111382 A | 10/1976 |
| JP | 59-93215 A | 5/1984 |
| JP | 56-17133 B2 | 11/2014 |

OTHER PUBLICATIONS

International Search Report in International Patent Application No. PCT/US2018/028907, dated Aug. 2, 2018 (2 pages).
Written Opinion in International Patent Application No. PCT/US2018/028907, dated Aug. 2, 2018 (9 pages).
Search Report in European Patent Application No. 23177195.7, dated Sep. 18, 2023 (7 pgs.).

METHOD AND APPARATUS FOR TRIMMING A CONTAINER

CROSS-REFERENCE TO RELATED APPLICATION(S)

This application is a continuation of U.S. application Ser. No. 16/607,448, filed Oct. 23, 2019, now issued as U.S. Pat. No. 11,141,802 on Oct. 12, 2021, which is a U.S. National Stage of International Application No. PCT/US2018/028907, filed Apr. 23, 2018, which claims priority to U.S. provisional patent application No. 62/492,030, filed Apr. 28, 2017, each of which is hereby incorporated by reference herein in its entirety.

TECHNICAL FIELD

The present disclosure relates generally to systems, methods, and devices for forming or processing an article of manufacture. More particularly, aspects of this disclosure relate to methods and apparatus for trimming thin-walled, generally cylindrical articles or containers, such as bottles and cans.

BACKGROUND

In the container manufacturing industry, various approaches exist for fabricating and processing different container constructions, including bottles, cans, jars, and the like. For example, a bodymaker machine may be used to form embryonic cylindrical containers from a generally flat sheet of material (e.g., aluminum). The embryonic cylindrical containers, which are generally shorter and have a larger diameter than the desired finished container, are exposed to redrawing, ironing, and/or doming processes to elongate the embryonic containers and reduce their diameters. These processes typically result in an irregular, wavy surface of uneven height around the circumference of the open end of the container. This irregular open end is undesirable because it may create problems or even cause the container to fail during further processing of the container.

To minimize the risk of such problems, the irregular open end of the embryonic container may be trimmed prior to further processing. A container trimming machine may be incorporated into the production line downline from the container bodymaker. In some systems, after exiting the bodymaker, embryonic containers are placed into an infeed chute that feeds the embryonic containers into a star wheel. The star wheel may then feed the embryonic containers to a trimming machine, which trims the irregular wavy surface from the embryonic container, resulting in a generally smooth open edge of the container.

To adjust for the trimming of containers having different diameters, a substantial change-over process is required of existing trimming machines. For example, to adjust for different container diameters, many components of existing trimming machines must be adjusted or replaced including, but not limited to, the distance between different components of the machine assembly (e.g., inner and outer spindles), blades, one or more gears that drive the various components, combinations thereof, or the like. The change-over process is further complicated by the fact that blades for trimming machines generally require very precise adjustments on the order of, e.g., about 0.025 mm (about 0.001 inches) or less.

Thus, it would be desirable to create an apparatus and methods for reducing the number of parts, time, and cost associated with the change-over process for trimming containers of differing diameters.

SUMMARY

According to one embodiment disclosed herein, a trimmer device includes a circular inner mounting block having a first central aperture for receiving a turret shaft of a processing turret. The inner mounting block has at least one inner bore. The trimmer device further includes a circular outer mounting block having a second central aperture for receiving the turret shaft. The outer mounting block having a larger diameter than the inner mounting block. The outer mounting block has at least one outer bore. The trimmer device further includes at least one inner trimmer spindle positioned through the at least one inner bore. A first end of the inner trimmer spindle includes a pilot having at least one inner spindle blade for trimming an interior of an article. The trimmer device further includes at least one outer trimmer spindle positioned through the at least one outer bore. The outer trimmer spindle includes at least one outer spindle blade positioned at a first end for trimming an exterior of the article. At least one of the inner mounting block or the outer mounting block is rotatable about the turret shaft to adjust for a diameter of the article such that the article may be positioned between the inner spindle blade and the outer spindle blade for trimming.

According to one method of configuring a processing turret for trimming an open end of an article disclosed herein, the method includes positioning a first end of an inner trimmer spindle through an inner bore of a circular inner circular mounting block. The inner mounting block has a first central aperture having a turret shaft positioned therethrough. A second end of the inner trimmer spindle includes a pilot having at least one inner spindle blade for trimming an interior of an article. The method further includes positioning a first end of an outer trimmer spindle through an outer bore of a circular outer mounting block. The outer mounting block has a second central aperture having the turret shaft being positioned therethrough. The outer mounting block has a larger diameter than the first mounting block. A second end of the outer trimmer spindle includes at least one outer spindle blade for trimming an exterior of an article. The method further includes rotating one of the inner mounting block or the outer mounting block relative to the other of the inner mounting block or the outer mounting block. The amount of rotation is dependent upon a diameter of the article to be trimmed.

The above summary does not represent every embodiment or every aspect of the present disclosure. Rather, the foregoing summary merely provides an exemplification of some of the novel aspects and features set forth herein. The above features and advantages and other features and advantages of the present disclosure, which are considered to be inventive singly or in any combination, will be readily apparent from the following detailed description of the illustrated examples and the modes for carrying out the present invention when taken in connection with the accompanying drawings and the appended claims.

BRIEF DESCRIPTION OF THE DRAWINGS

FIG. FB illustrates a second perspective side view of the trimmer assembly of FIG. 1A.

The present disclosure is susceptible to various modifications and alternative forms, and some representative embodiments have been shown by way of example in the drawings and will be described in detail herein. It should be understood, however, that the inventive aspects are not limited to the particular forms illustrated in the drawings. Rather, the disclosure is to cover all modifications, equivalents, and alternatives falling within the spirit and scope of the invention as defined by the appended claims.

DETAILED DESCRIPTION OF ILLUSTRATED EXAMPLES

This disclosure is susceptible of embodiment in many different forms. There are shown in the drawings, and will herein be described in detail, representative embodiments, with the understanding that the present disclosure is to be considered as an exemplification of the principles of the present disclosure and is not intended to limit the broad aspects of the disclosure to the embodiments illustrated. To that extent, elements and limitations that are disclosed, for example, in the Abstract, Summary, and Detailed Description sections, but not explicitly set forth in the claims, should not be incorporated into the claims, singly or collectively, by implication, inference, or otherwise. For purposes of the present detailed description, unless specifically disclaimed or logically prohibited, the singular includes the plural and vice versa, and the words "including," "comprising," or "having" mean "including without limitation." Moreover, words of approximation, such as "about," "almost," "substantially," "approximately," and the like, can be used herein in the sense of, for example, "at, near, or nearly at," or "within 3-5% of," or "within acceptable manufacturing tolerances," or any logical combination thereof. The drawings are provided for illustration purposes, and the features shown therein are not necessarily to scale.

The devices described herein facilitate precise trimming of thin-wall cylindrical objects such as metal beverage containers. The trimmer devices for trimming thin-walled metal cylinders described herein include features for reducing cost, setup time, and/or change-over time. Features of the trimmer devices allow for a reduction in the number of parts required for a change-over (e.g., to accommodate containers having varying diameters). Moreover, gears used to drive the cutting apparatus aced not be changed when the trimmer device is adjusted for the trimming of cylinders having a different diameter.

Figure 1A:
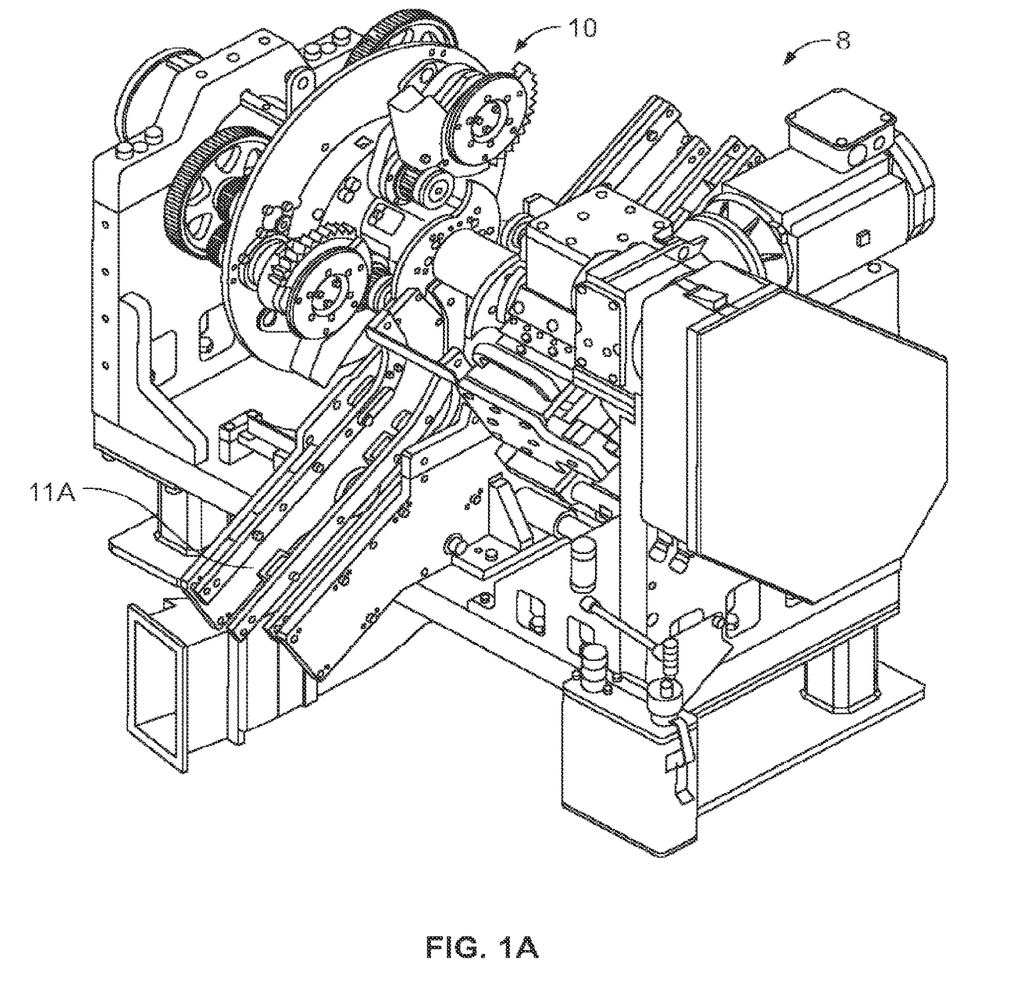
FIG. 1A illustrates a first perspective side view of a trimmer assembly according to one embodiment.
Figure 1B:
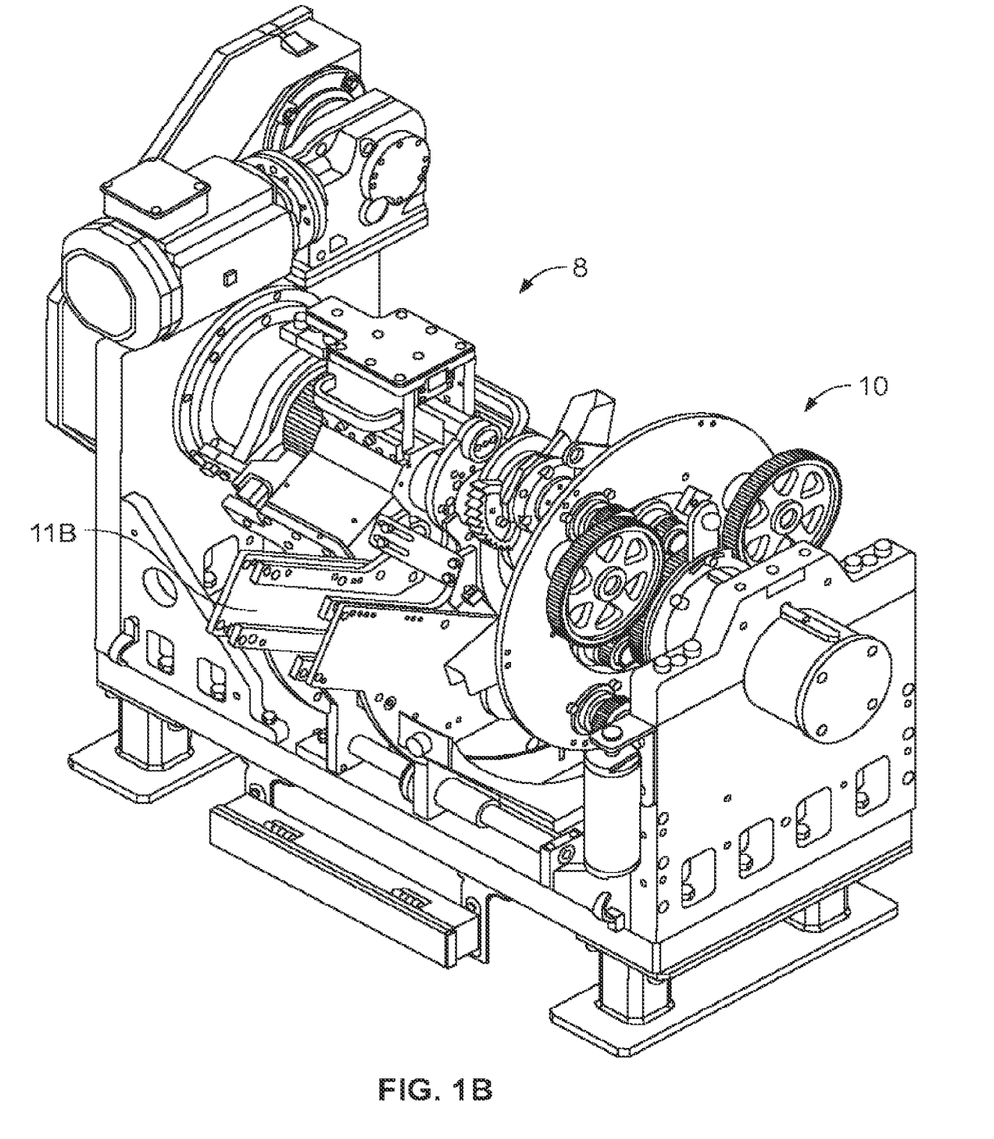

A trimmer device, as described herein, may be included in a separate machine or one machine in a machine line. FIGS. 1A-1B illustrate a trimmer device assembly 8 including a trimmer device 10 (as will be described in more detail below) coupled with various functional mechanical components. The trimmer device 10 is generally used to trim an irregular wavy surface from the open end of an embryonic container resulting from the elongation of the container body and/or the reduction of the container diameter that occurs during formation of the embryonic container by the bodymaker. In some embodiments, embryonic cylindrical containers exiting the bodymaker are lifted by a conveyor and deposited on a first track 11a that is coupled to the trimmer device 10 (see FIG. 1A). The conveyor may be a chain conveyor and/or may have hook-shaped rubber fingers for lifting and moving the containers.

Once trimmed by the trimmer device 10, the resulting container may then be passed from the trimmer device 10 via a second track 11b (see FIG. 1B) to a machine line where the container may be processed/formed through any number of stages (e.g., one or more necking stages) on a machine line. When all process/forming stages are complete, the container is discharged from the machine line.

Figure 1C:
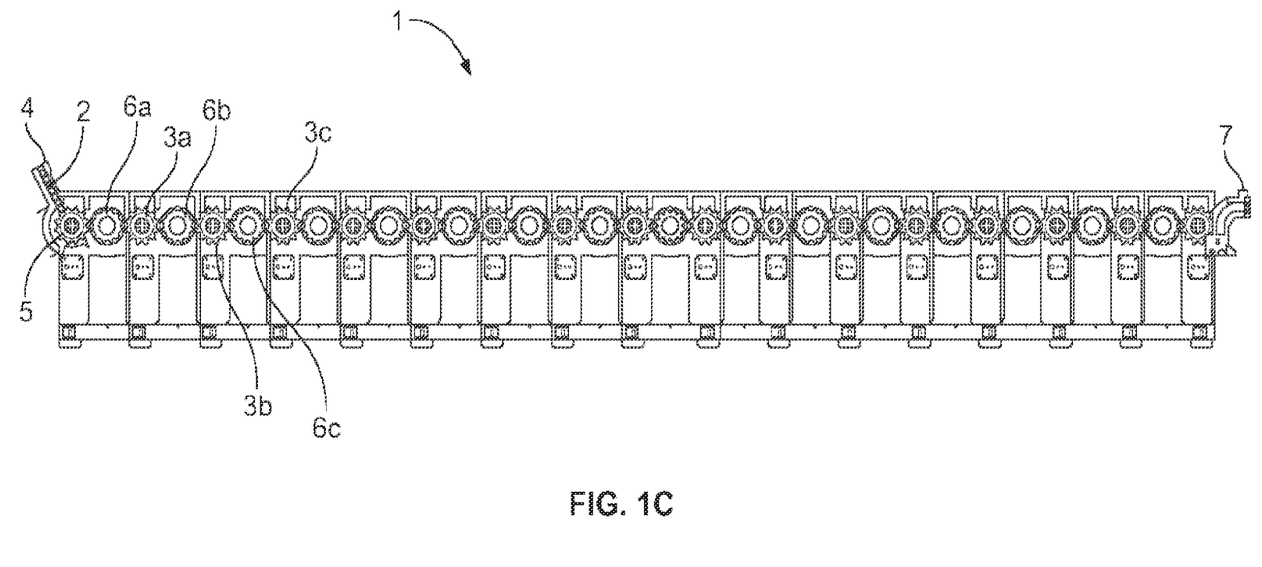
FIG. 1C illustrates an example machine line that processes containers as they pass through a series of processing turrets, according to aspects described herein.

FIG. 1C illustrates an exemplary machine line 1, which is adapted to perform trimming, necking, flanging, and/or other processing on containers 2 as the containers 2 pass through a series of processing turrets 6 in a generally serpentine path. The machine line may be a recirculating machine line or any other type of machine line. As used herein, "container" broadly refers to any article that is at any stage of manufacture to produce a finished container, including embryonic containers. Examples of containers include, but are not limited to, metal (e.g., aluminum, steel, other stress-induced plastically deformed containers, etc.) cans or bottles.

The containers 2 exiting the trimmer device 10 may, at a later stage in the machine line, be fed through a container infeed 4 to an infeed vacuum star wheel 5. After passing through the vacuum star wheel 5, the containers 2 are released to be processed to a first turret 6a.

The containers 2, which may be held in position on the first transfer star wheel 3a by a vacuum (a pneumatic pressure differential), orbit about the rotational axis of the first transfer star wheel 3a so that the containers 2 are moved about at least a portion of the first transfer star wheel 3a. In the embodiment depicted in FIG. 1C, the containers 2 are passed from the the vacuum star wheel 5 to a first processing turret 6a and enter a processing step. The containers 2 then travel from the first processing turret 6a to a first transfer star wheel 3a, from the first transfer star wheel 3a to a second processing turret 6b, from the second processing turret 6b to a second transfer star wheel 6b, and so on for as many transfer star wheel and/or processing turrets that are in the machine line 1, and then on to the exit 7.

Each star wheel may have any number of stations to hold articles for processing or transfer. For example, a star wheel may have six, eight, or ten stations to hold six, eight, or ten articles, respectively. It will be recognized that the star wheel is capable of having from one station to any suitable number of stations.

In other embodiments, star wheels (e.g., the first star wheel 3a) may be used to deliver the containers from another device (e.g., a bodymaker) to the trimmer device 10. In such embodiments, the first track 11a of FIG. 1A may be eliminated or used on a more limited way. In such embodiments, the trimmer device 10 may be placed into, e.g., a "necker" machine (which typically lubricates, followed by "necking" through multiple stages, placing flanges, and then inspection) or a "bodymaker" machine. Referring to the "necker" machine example of FIG. IC, the positions labeled a 6a, 6b, and 6c correspond with turret positions for trimmer (or other) devices. The containers may be delivered to the turrets by vacuum staff heels at the infeed and every-other (i.e., alternating) position along the necker machine line. In this embodiment, a 2:1 gear ratio from the outer spindle 14 to the main shaft 110 of the trimmer device 10 (as described in more detail below) may be useful for reducing the angle of turret rotation required to trim a container.

Various aspects of the trimmer device contemplated by the present disclosure, which may be utilized in the machine line just described, will now be discussed.

Figures 2A, 2B:
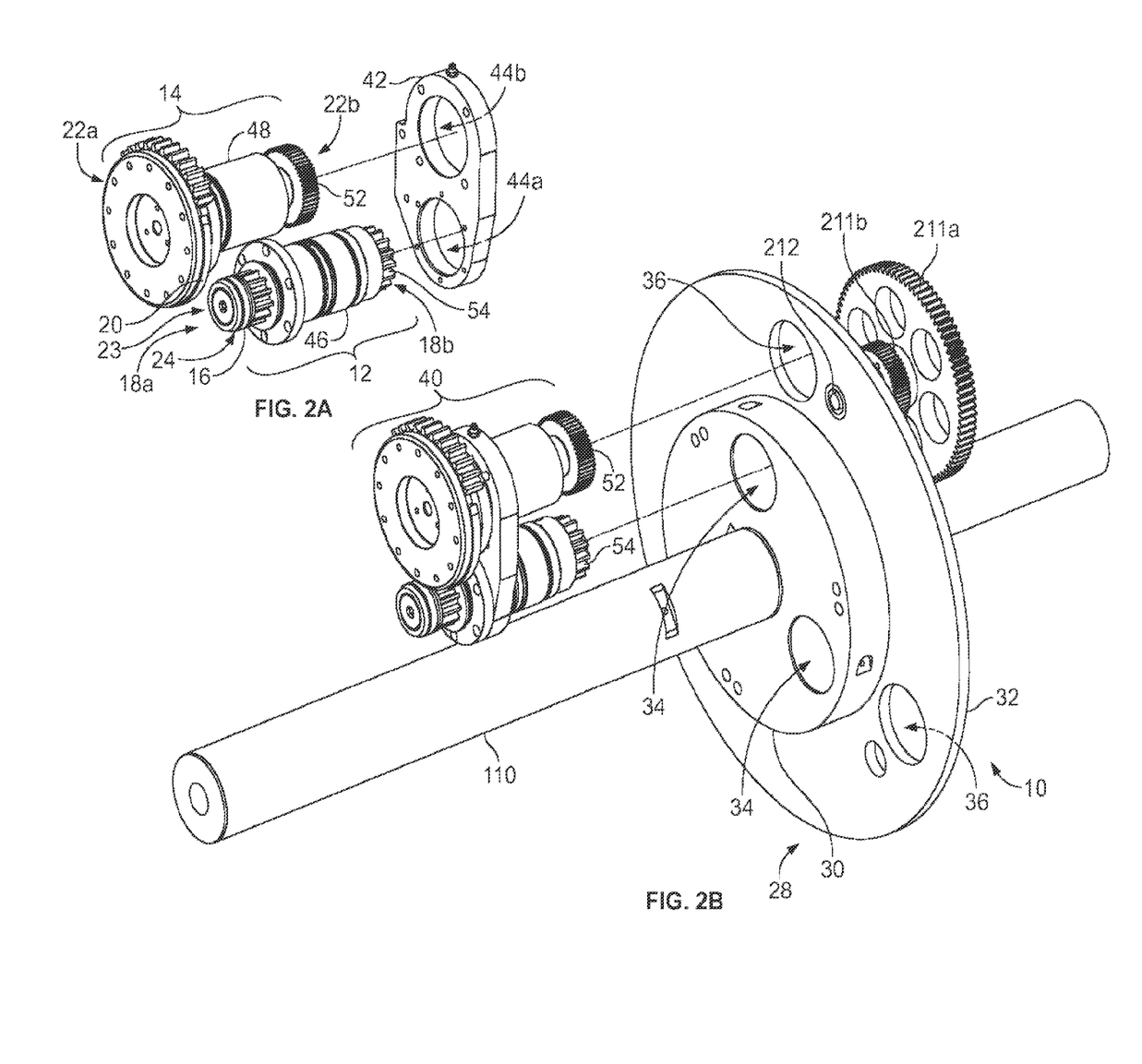
FIG. 2A is a perspective, exploded view of a cartridge assembly according to one embodiment.
FIG. 2B is a perspective view of a portion of a trimmer device incorporating the cartridge assembly of FIG. 2A.
Figure 2C:
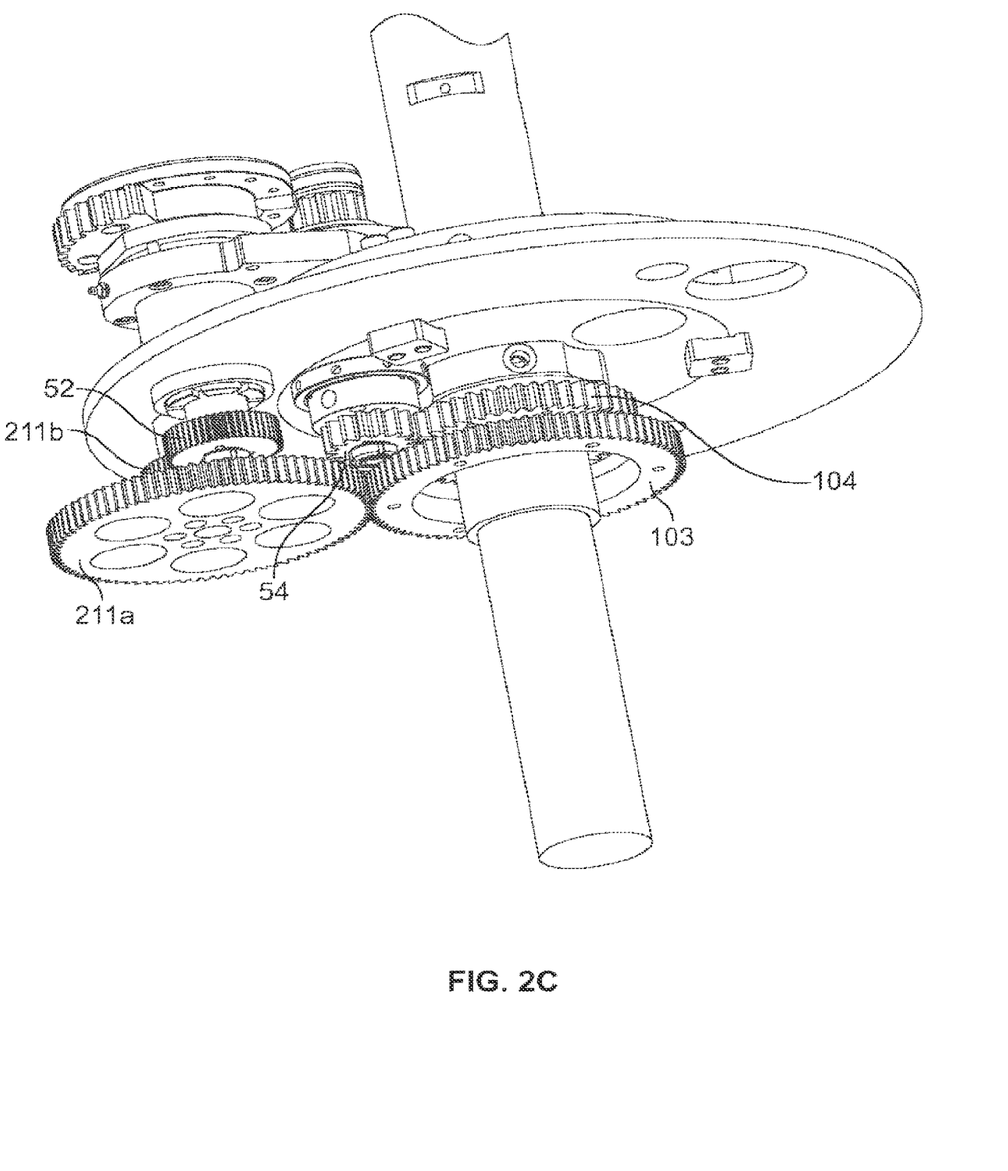
FIG. 2C is another perspective view of the trimmer device of FIG. 2B.
Figure 2D:
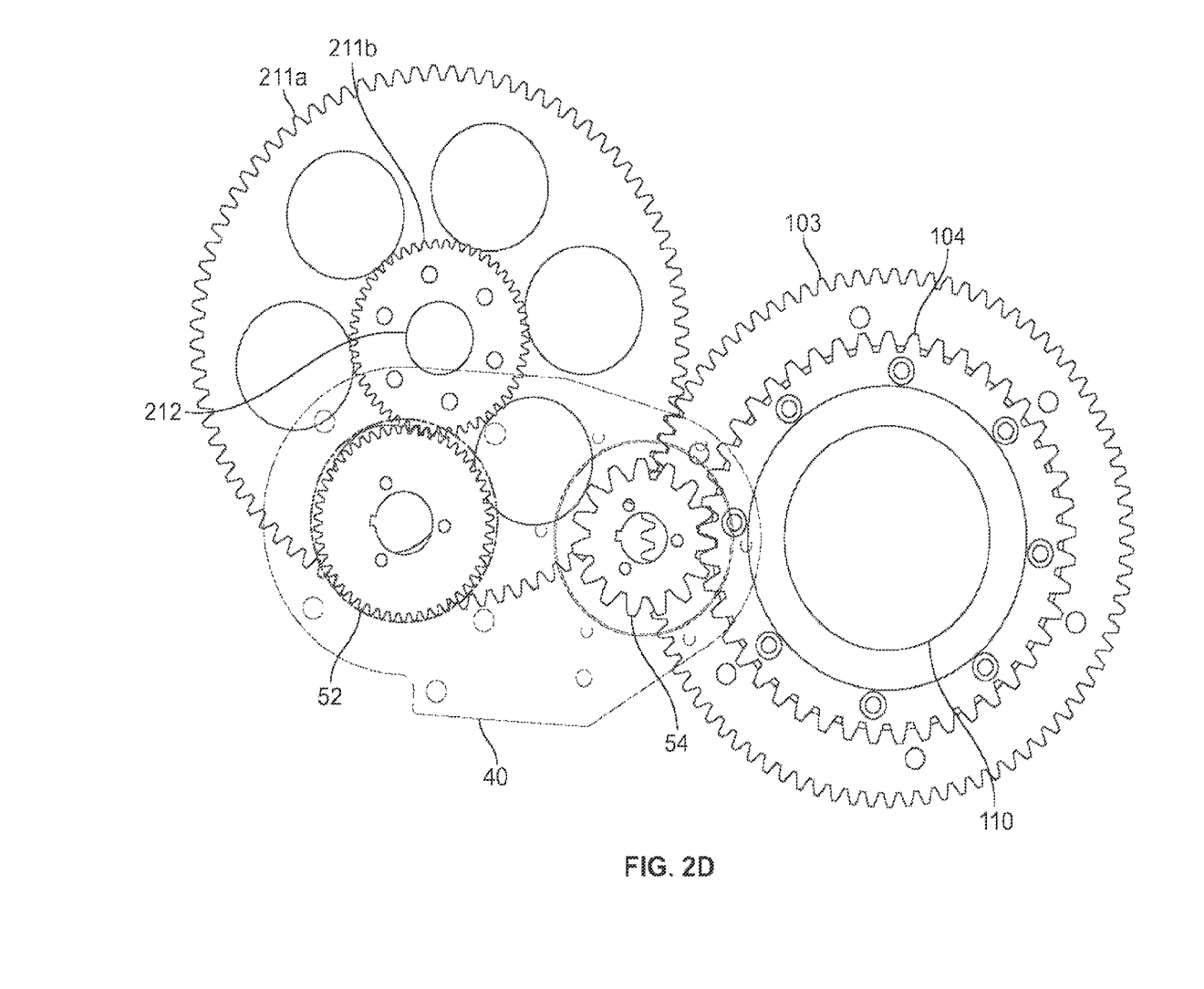
FIG. 2D is a top view showing the interrelation of the various gears shown in FIG. 2C.
Figure 2E:
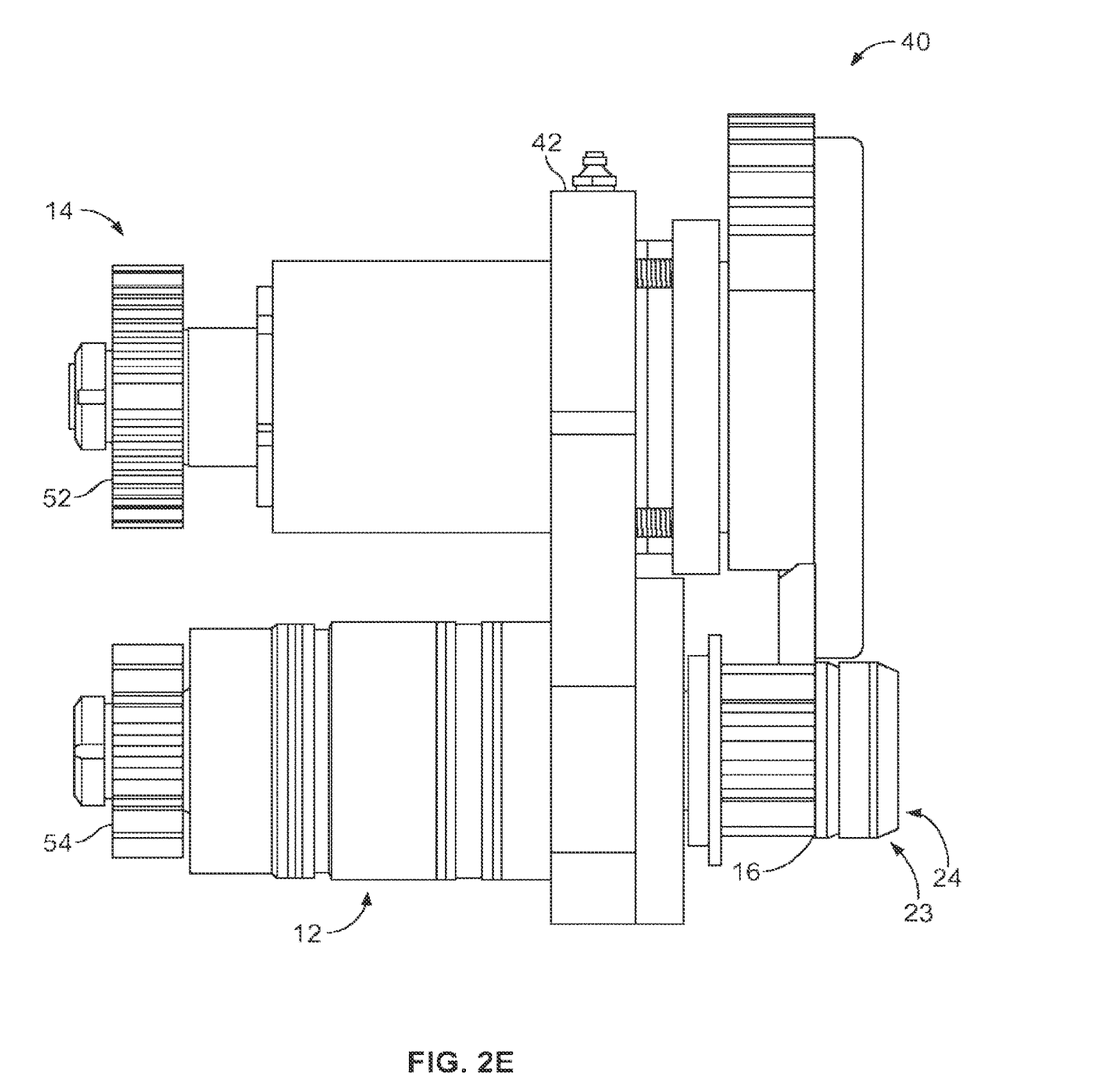
FIG. 2E is a side view of the cartridge assembly of FIG. 2A in an assembled state.

In the non-limiting embodiment shown in FIGS. 2A, 2B, 2E two generally parallel spindles 12, 14 with rotating blades for use in a trimmer device 10 to trim a container precisely to a desired length are shown. The spindles 14, 12 are geared to one another at a particular ratio (e.g., 3:1). A first circular inner blade 16 that is very slightly smaller than the inside of the container to be trimmed is positioned at first end 12A of the "inner" spindle 12. In some embodiments, the inner blade 16 is mounted on a trimmer head 23 (as further described below). The inner blade 16 is used for trimming an interior of the container. A second outer blade 20 that has an arc of slightly more than 120° (e.g., about 123°, for example) and about three times the radius of the first blade 16 is mounted on a first end 22a of the "outer" spindle 14. One-third of the rotation of the outer spindle 14 is used for loading, the container over the inner blade 16 on the inner spindle 12, during which time no object interferes with the inner blade 16. A second third of the rotation of the outer spindle 14, which positions the outer blade 20 to slightly overlap the inner blade 16, is used for cutting an exterior of the container. During the final third of the rotation, a trimmed portion of the container is split with a blade and corrugated for disposal with a corrugating tool.

As shown in FIGS. 2A-2B, 2E, the inner spindle 12 includes a trimmer head 23 having a trimmer pilot 24. In some embodiments, the outer diameter and the dimensions of the pilot 24 are sized such that the trimmer head 23 may be roughly centered with respect to an opening of the container during the trimming process. That is, the pilot 24, in some embodiments, is of different sizes for different container diameters. Accordingly, various size pilots may be utilized with the inner spindle 12 described herein based on the size/diameter of the opening of the can/bottle to be trimmed.

Each of the trimmer spindles 12, 14 includes a respective shaft 46, 48. Each of the trimmer spindles 12, 14 further includes a respective gear 52, 54 to rotate the respective shaft 46, 48. The inner spindle shaft 46 may be connected to the trimmer head 23 such that the shaft 46 rotates the trimmer head 23.

Returning now to FIGS. 2B-2C, the trimmer device 10 is shown according to one non-limiting embodiment. The trimmer device 10 includes a mounting block assembly 28 coupled to a turret shaft 110. The mounting block assembly 28 includes an inner spindle-mounting block 30 and an outer spindle-mounting block 32. Each of the inner spindle-mounting block 30 and outer spindle-mounting block 32 is generally circular (disc-shaped) and includes a respective generally central aperture through which the turret shaft 110 is positioned. The outer spindle-mounting block 32 has a larger diameter than the inner spindle-mounting block 30. Each of the inner spindle-mounting block 30 and outer spindle-mounting block 32 further includes one or more bores 34, 36 positioned near a periphery of the respective spindle-mounting block 30, 32. At least one of the inner spindle-mounting block 30 and outer spindle-mounting block 32 is rotatable about the turret shaft 110 and relative to the other of the inner spindle-mounting block 30 and outer spindle-mounting block 32.

FIGS. 2A-2E illustrate the trimmer device 10 utilizing a cartridge assembly 40 according to one non-limiting embodiment. In the embodiment of FIGS. 2A-2E, the inner spindle 12 and the outer spindle 14 are mounted to a plate or housing 42 to form the cartridge assembly 40. The housing 42 includes two apertures 44a, 44b configured to receive the shaft 46, 48 of the inner spindle 12 and the outer spindle 14, respectively. As briefly discussed above, the shaft 48 of the outer spindle 14 includes the outer spindle gear 52 coupled to a second end 22b thereof. The housing 42 is intended for a somewhat limited diameter range to be trimmed and, therefore, may be replaced when a substantially different diameter of cylinder is to be trimmed.

As briefly discussed above, in one embodiment, the inner spindle-mounting block 30 is generally fixed relative to the turret shaft 110, in this embodiment, once the cartridge assembly 40 is assembled, the inner spindle shaft 46 is inserted into the bore 34 of the inner spindle-mounting block 30. The outer spindle-mounting block 32 may then be rotated about the turret shaft 110 centerline for the purpose of adjustment for container diameter and aligning the outer spindle shaft 48 with the bore 36 of the outer spindle-mounting block 32.

Once the outer spindle shaft 48 and the outer bore 36 are aligned, the outer spindle-assembly shaft 48 may be inserted into the bore 36 of the outer spindle-mounting block 32. The cartridge assembly 40 may be fully inserted to fix the position of the cartridge assembly 40 and the outer spindle-mounting block 32 relative to the turret shaft 110 and the inner spindle-mounting block 30.

Figure 3A:
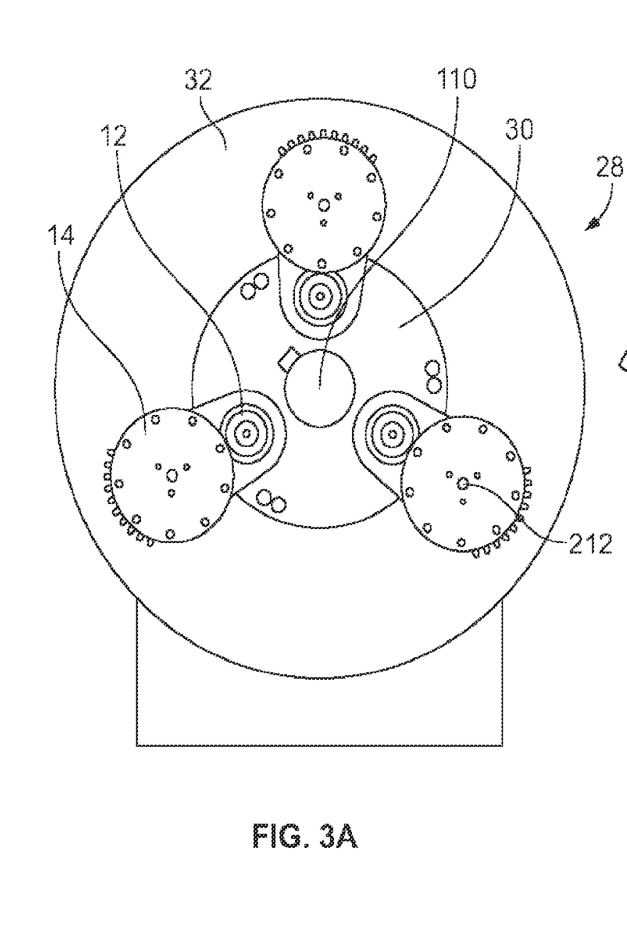
FIG. 3A depicts a first end of a mounting block assembly configured to trim a container having a first diameter according to one embodiment.
Figure 3B:
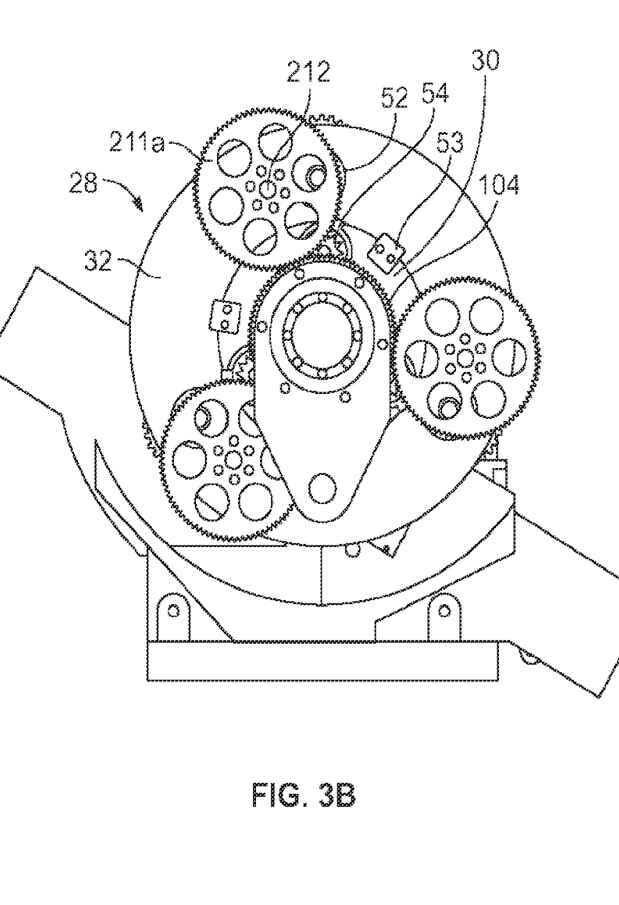
FIG. 3B depicts a second, opposing end of the mounting block assembly of FIG. 3A.
Figure 4A:
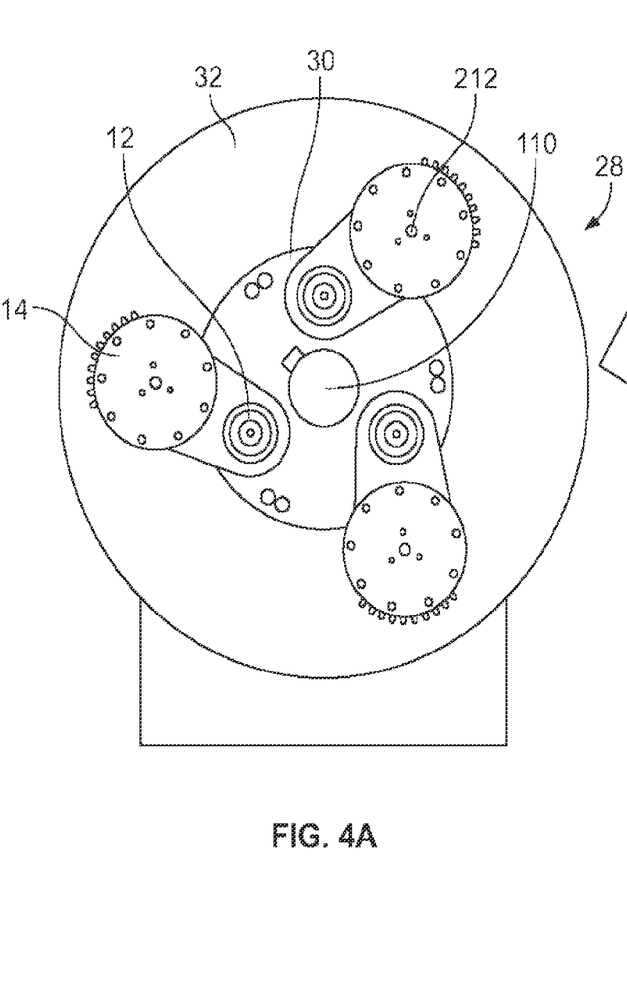
FIG. 4A depicts the first end of the mounting block assembly of FIG. 3A configured to trim a container having a second diameter.
Figure 4B:
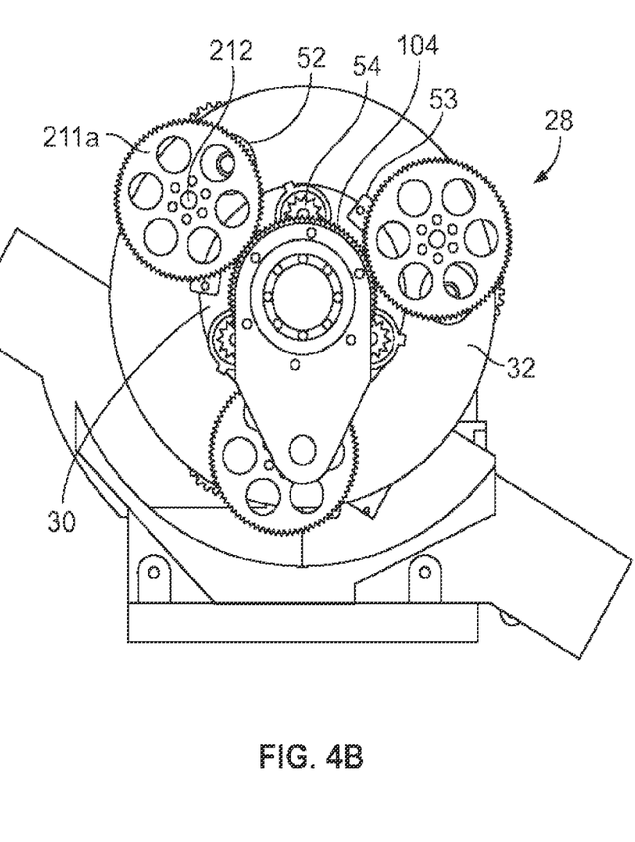
FIG. 4B depicts the second, opposing end of the mounting block assembly of FIG. 4A.

FIGS. 3A-3B show the mounting block assembly 28 configured to trim a container having a first diameter, and FIGS. 4A-4B show the mounting block assembly 28 adjusted to trim a container having a second, larger diameter. As shown in FIGS. 3-4, in order to trim a container having a diameter that is larger than that of a previously trimmed container, one of the inner spindle-mounting block 30 or the outer spindle-mounting block 32 is rotated relative to the other of the inner spindle-mounting block 30 or the outer spindle-mounting block 32 about the turret shaft 110 centerline such that the distance between the inner spindle 12 and the outer spindle 14 (and the respective blades 16, 20 thereon) is increased, As such, a container having a larger diameter may fit between the blades 16, 20 for trimming. In the illustrated embodiment of FIGS. 3-4, the degree of rotation is about 60°. It is contemplated that the inner spindle-mounting block 30 or the outer spindle-mounting block 32 may be rotated any suitable amount, depending on the diameter of the container to be trimmed.

Figure 5:
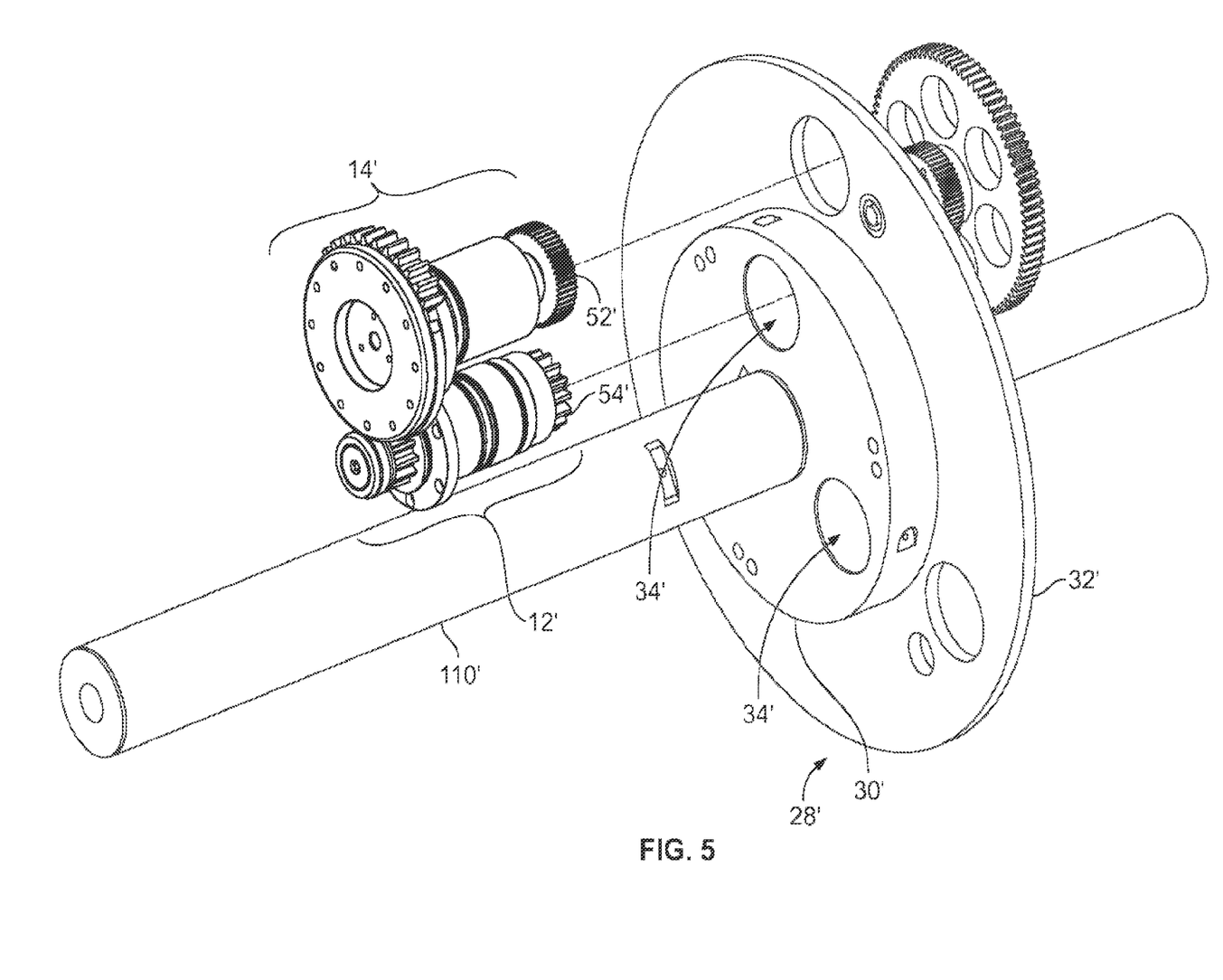
FIG. 5 is a perspective view of a portion of a trimmer device according to another embodiment.

Turning now to FIG. 5, a second embodiment of a trimmer device 10' similar to that of FIGS. 2A-2D, but not utilizing a housing to form a cartridge assembly, is shown. As such, in the trimmer device 10' of FIG. 5, inner and outer spindles 12', 14' are not coupled to one another prior to their insertion into a mounting block assembly 28'. The inner spindle 12' is positioned in a respective bore 34' of an inner spindle-mounting block 30'. A corresponding outer spindle 14' is positioned in a separate, outer spindle-mounting block 32' having a larger diameter than the inner spindle-mounting block 30'. The distance between the inner and outer spindles 12', 14' may be adjusted for container diameter by rotating the inner spindle-mounting block 30' or outer spindle-mounting block. 32' relative to the other of the inner spindle-mounting block 30' or outer spindle-mounting block 32' about the centerline of the turret shaft 110'. Once the proper alignment is achieved, the inner spindle-mounting block 30' and the outer spindle-mounting block 32' may be fixed relative to one another and/or with respect to the turret shaft 110' using any suitable mechanism including, but not limited to clamps 53' (see FIGS. 3B, 4B), a screw and nut mechanism, or the like. Such fixing mechanisms may also be used in embodiments using the cartridge housing 42 (FIGS. 2A-2E).

A gear assembly may be used to drive the inner spindle 12, 12' and the outer spindle 14, 14'. Although, for simplicity, the gear assembly will be described with respect to the trimmer device 10 of FIGS. 2A-2E, the same or a similar gear assembly may also be used in association with the trimmer device 10' of FIG. 4.

Referring to FIGS. 2C-2D, 3B, 4B first and second sun gears 103, 104 are shown having respective central apertures for receiving the turret shaft 110. The first and second sun gears 103, 104 are generally fixed relative to one another, are rotatable for adjustment, and are generally not rotated relative to the machine base during operation of the trimming machine. The first sun gear 103 engages with intermediate gears 211a, 211b that are fixed relative to one another and rotate on spindles or bearings 212. The bearings 212 are fixed in position relative to the outer spindle-mounting block 32. The intermediate gear bearings 212 may be mounted directly to the outer spindle-mounting block 32 or to a carrier that is fixed relative to the outer spindle-mounting block 32. The intermediate gears 211a, 211b engage the outer spindle gear 52 of the outer spindle 14 to drive the outer spindle 14 (see FIG. 2C). In some embodiments, the gears 211a, 211b are in an assembly that facilitates rapid removal and installation to more easily mesh the gears 211a, 211b during cartridge installation.

In one embodiment, gears are selected to provide one rotation of the outer spindle 14 per one rotation of the trimming turret in the opposite direction of rotation to the inner spindle 12. It is also contemplated that the gears may provide two rotations of the outer spindle 14 per one rotation of the trimming turret in the opposite direction of rotation to the inner spindle 12, where the ratio of the radius/diameter of the outer spindle (e.g., the second outer blade 20) to that of the inner spindle (e.g., the inner blade 16) remains about 3:1. A second sun gear 104 having a central aperture through which the turret shaft 110 is positioned engages the inner spindle gear 54 mounted on a second end 18b of the inner spindle 12 to drive the inner spindle 12.

Although only one cartridge assembly 40 is shown in FIGS. 2B-2D, it is contemplated that more cartridge assemblies may be incorporated in the trimmer device 10. For example, a second inner spindle and outer spindle may be positioned through a second set of bores 34, 36. Likewise, although only one inner spindle 12' outer spindle 14' pair is shown in FIG. 5, it is contemplated that more than one such pair may likewise be incorporated into the trimmer device 10'. In such embodiments, the plurality of cartridge assemblies or inner spindle/outer spindle pairs and arranged at generally the same radius from the center of the turret shaft 110, 110'. Inner spindles 12, 12' are maintained in fixed equally-spaced positions relative to one another, and outer spindles 14, 14' are maintained in fixed equally spaced positions relative to one another.

One advantage of the trimmer devices described herein is that they may be relatively easily adjusted to be used with containers having different diameters. For example, the trimmer devices described herein enable performing precise adjustments upon removal from the machine, thereby facilitating ease in making adjustments. Moreover, cartridge assemblies (see FIGS. 2A-2E) and/or spindles pairs (FIG. 5) used for one diameter of container to be trimmed may likewise be used to trim a container of a different diameter. Put another way, the spindles and gear assemblies described herein may be used in trimming multiple container diameters, thereby reducing the number of spindles required to outfit a machine to accommodate multiple diameter cylinders. The trimmer devices described herein may also be used with existing means of presenting containers to the cutting apparatus, e.g., a ram that holds the container while moving in and out of position or combinations of vacuum and jets of air.

Spindle and blade positions may be set by a combination of easy-to-understand shims placed between components on the shaft 110 (e.g., the blade 16 and/or the corrugating tool) or between the spindle 12, 14 and housing 42 to position the blades and the unique mounting block assemblies 28, 28' described herein. All of the angles of the outer spindle shafts may be set simultaneously by a rotational adjustment of the sun gear 103 that is centered on the turret shaft 110, 110', In contrast to existing systems, the gears used in the systems described herein may be the same for a full range of diameter changes. As such, none of the gears is required to be removed or replaced for container-diameter changes; only the spindle gears 52, 54 must be re-meshed as the spindles or spindle cartridges are installed. For example, the outer spindle-mounting block 32, 32' may align and fix the spindles or spindle cartridges in position as they are installed.

The devices described herein also allow for rapid changeover. For example, the cartridge assembly 40 of FIGS. 2A-2E may be prepared in advance of a changeover. As such, fewer parts are required to be removed and replaced for diameter changes.

Figure 6A:
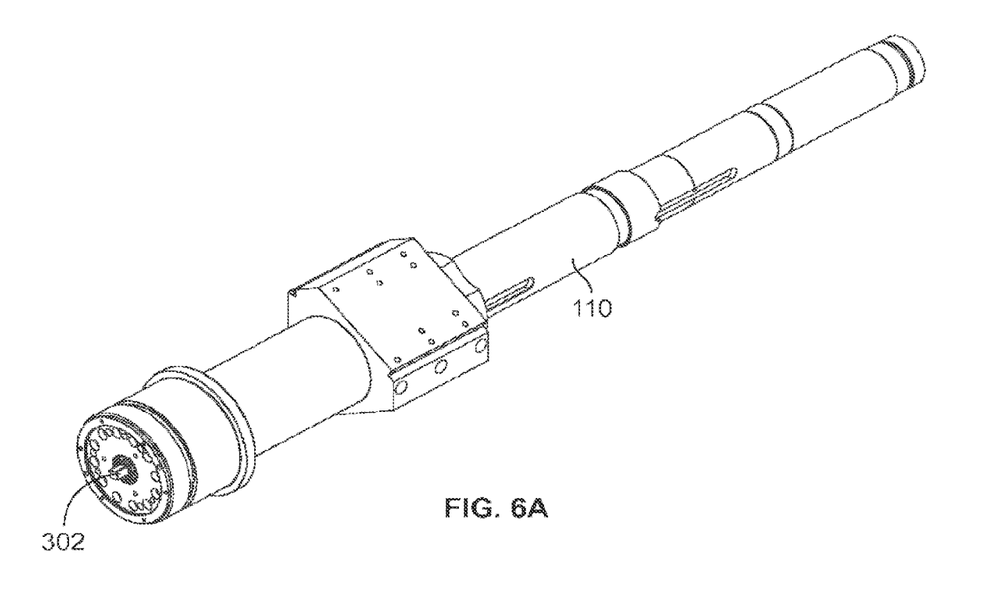
FIG. 6A is a side view of a turret device adjustment mechanism according to one embodiment.
Figure 6B:
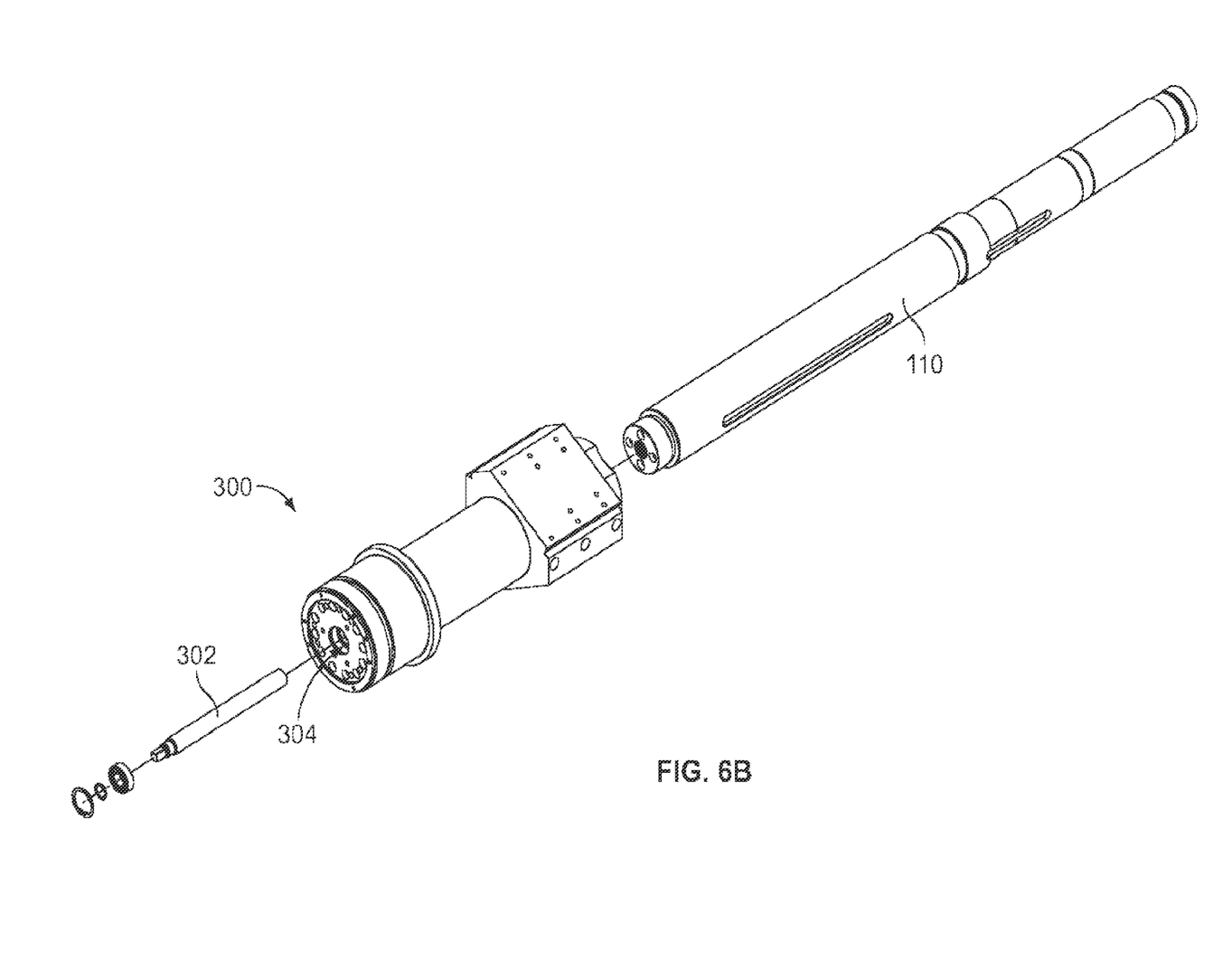
FIG. 6B is an exploded view of the turret device adjustment mechanism of FIG. 6A.
Figure 6C:
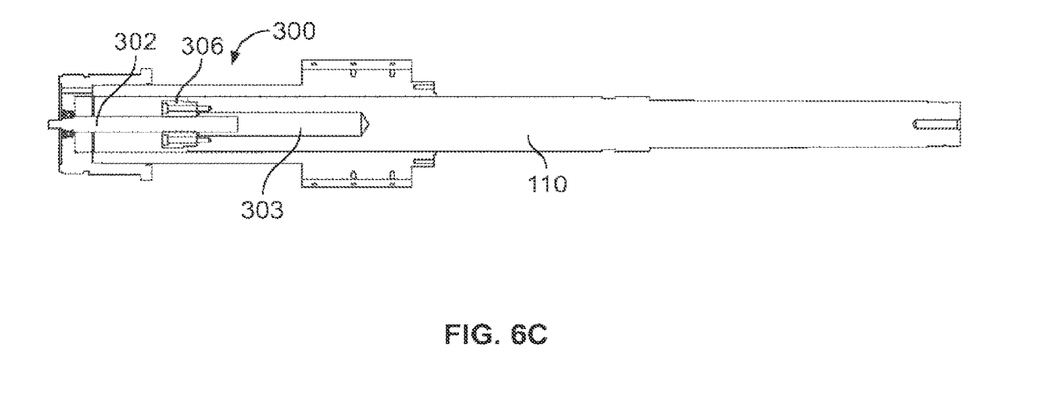
FIG. 6C is a cross-sectional side view of the adjustment mechanism of FIGS. 6A-6B.

As shown in FIGS. 6A-6C, the trimmer device 10 may include a shaft-centered position adjustment mechanism 300 utilizing a feature (e.g., a screw 302) for adjusting the position of the trimmer device 10 relative to rams that present articles to be trimmed to the trimmer device 10 to adjust for the height of a container to be trimmed. The shaft 110 includes a hollow cavity 303 therein. The ram housing to be used with the trimmer device 10 also includes a hollow portion 304 configured to receive the shaft 110 therethrough. When the shaft 110 is inserted through the hollow portion 304 of the ram housing, the screw 302 (e.g., an acme screw) may be secured to the shaft 110 by a nut 306 (e.g., an acme nut) (see FIG. 6C). Applying a force to move the components through the center of the shaft 110 assists in assuring that components will not misalign and/or bind due to an off-center load. The arrangement also facilitates rapid adjustment for the length of the article to be trimmed.

Yet another advantage of the devices of the embodiments described herein is that fewer components are required, thereby generally resulting in cost savings on components. For example, the spindles can be used for cartridges and mounting block assemblies 28, 28' assembled for different container diameters. Furthermore, the gears on the machine may be used for various container diameter setups, i.e., diameter-specific gear sets are not needed. Motor speed or drive ratio changes for different container diameters are also not necessary.

According to one alternative embodiment, straight-line adjustment of spindle center distance may be facilitated by four gears that are linked together between the cartridges. Such a gear arrangement is utilized on a Belvac CC93QC trimmer. Adjustment of spindle center distance may be facilitated by rotating one spindle about the center of a gear that is not centered on the other spindle. The outer diameters of the blades are eccentric to the spindle bores (and, therefore, the shaft) to facilitate fine adjustments of the blade overlap. The position of the eccentric housing may be fixed by, e.g., clamping.

In some embodiments, the inner spindle 12 includes a hollow portion to provide an air passage for a pulsed jet of air to seat the containers to a vacuum chuck as they are seated onto a turret star wheel.

The present invention is not limited to the precise construction and compositions disclosed herein; any and all modifications, changes, and variations apparent from the foregoing descriptions are within the spirit and scope of the invention as defined by the appended claims. Moreover, the present concepts expressly include any and all combinations and subcombinations of the preceding features and aspects.

What is claimed:

1. A trimmer device, comprising:
   a circular inner mounting block having a first central aperture, the inner mounting block having at least one inner bore;
   a circular outer mounting block having a second central aperture generally aligned with the first central aperture, the outer mounting block having a larger diameter than the inner mounting block, the outer mounting block having at least one outer bore;
   at least one inner trimmer spindle positioned through the at least one inner bore; and
   at least one outer trimmer spindle positioned through the at least one outer bore;
   a first end of at least one of the inner trimmer spindle or the outer trimmer spindle including a pilot having at least one spindle blade for trimming the article,
   wherein at least one of the inner mounting block or the outer mounting block is rotatable relative to the other of the inner mounting block or the outer mounting block such that the relative rotation of the inner and outer mounting blocks generates a variation of the distance between the inner trimmer spindle and the outer trimmer spindle.

2. The trimmer device of claim 1, wherein
   the at least one inner bore is a plurality of inner bores, each of the plurality of inner bores positioned at the same radius from the first central aperture,
   the at least one outer bore is a plurality of outer bores, each of the plurality of outer bores positioned at the same radius from the second central aperture,
   the at least one inner trimmer spindle is a plurality of inner trimmer spindles, and
   the at least one outer trimmer spindle is a plurality of outer trimmer spindles.

3. The trimmer device of claim 1, wherein the outer mounting block is rotatable about a turret shaft extending through the first and second central apertures, the inner mounting block being fixed relative to the turret shaft.

4. The trimmer device of claim 3, further comprising one or more mechanisms for fixing the outer mounting block to the inner mounting block.

5. The trimmer device of claim 4, wherein the mechanism includes clamps.

6. The trimmer device of claim 1, wherein the at least one inner trimmer spindle and the at least one outer trimmer spindle are coupled to one another via a cartridge housing.

7. The trimmer device of claim 6, wherein the cartridge housing includes a first and second aperture for receiving the inner trimmer spindle and the outer trimmer spindle, respectively.

8. The trimmer device of claim 1, wherein a second end of the at least one inner trimmer spindle includes a respective inner spindle gear and a second end of the at least one outer spindle includes a respective outer spindle gear.

9. The trimmer device of claim 8, further comprising:
   a first and second intermediate gear configured to rotate about a bearing, the bearing being fixed relative to the outer mounting block, the first and second intermediate gears being fixed relative to one another; and
   a first and second sun gear having respective central apertures generally aligned with the first and second central apertures, the first and second sun gears being fixed relative to one another,
   wherein the first sun gear engages the first intermediate gear and the second intermediate gear engages the outer spindle gear to drive the outer spindle, the second sun gear engaging the inner spindle gear to drive the inner trimmer spindle.

10. The trimmer device of claim 1, wherein rotation of the outer spindle is in a direction opposite a direction of rotation of the inner trimmer spindle.

11. The trimmer device of claim 1, wherein one rotation of the processing turret causes two rotations of the outer spindle in a direction opposite a direction of rotation of the inner trimmer spindle.

12. The trimmer device of claim 1, further comprising a push ram assembly for moving the article, a first end of the push ram assembly including a feature for holding the article.

13. The trimmer device of claim 1, wherein the inner trimmer spindle includes a pilot, the inner trimmer spindle being configured to receive the article such that the pilot becomes located inside an open end of the article.

14. A method of configuring a processing turret for trimming an open end of an article, the method comprising:
   positioning a first end of an inner trimmer spindle through an inner bore of a circular inner mounting block, the inner mounting block having a first central aperture having a turret shaft positioned therethrough;
   positioning a first end of an outer trimmer spindle through an outer bore of a circular outer mounting block, the outer mounting block having a second central aperture having the turret shaft being positioned therethrough, the outer mounting block having a larger diameter than the inner mounting block, a second end of at least one of the inner trimmer spindle or the outer trimmer spindle including at least one spindle blade for trimming the open end of the article; and
   rotating one of the inner mounting block or the outer mounting block relative to the other of the inner mounting block or the outer mounting block, such that the relative rotation of the inner and outer mounting blocks generates a variation of the distance between the inner trimmer spindle and the outer trimmer spindle.

15. The method of claim 14, wherein the outer mounting block is rotated relative to the inner mounting block, the inner mounting block being fixed relative to the turret shaft.

16. The method of claim 14, further comprising, prior to positioning the first end of the inner trimmer spindle through the inner bore and the first end of the outer trimmer spindle through the outer bore, coupling the inner trimmer and the outer trimmer spindle to one another via a cartridge housing.

17. The method of claim 16, further comprising:
positioning the first end of the inner trimmer spindle through a first aperture in the cartridge housing; and
positioning the first end of the outer trimmer spindle through a second aperture in the cartridge housing.

18. The method of claim 14, wherein a second end of the at least one inner trimmer spindle includes a respective inner spindle gear and a second end of the at least one outer spindle includes a respective outer spindle gear.

19. The method of claim 18, further comprising rotating a first and second sun gear about the turret shaft, the first and second sun gears being fixed relative to one another, the first sun gear engaging a first intermediate gear, the first intermediate gear rotating about a bearing, the bearing being fixed relative to the outer mounting block, the first intermediate gear being fixed to a second intermediate gear, the second intermediate gear engaging the outer spindle gear to drive the outer trimmer spindle, the second sun gear engaging the inner spindle gear to drive the inner trimmer spindle.

20. The method of claim 14, wherein one rotation of the processing turret causes one rotation of the outer trimmer spindle in a direction opposite a direction of rotation of the inner trimmer spindle.

21. The method of claim 14, further comprising moving the article toward the pilot via a push ram assembly, a first end of the push ram assembly including a feature for holding the article.

* * * * *